July 24, 1923.
M. E. E. DARDANI
GASOLINE FILTER
Filed Sept. 7, 1921
1,463,006
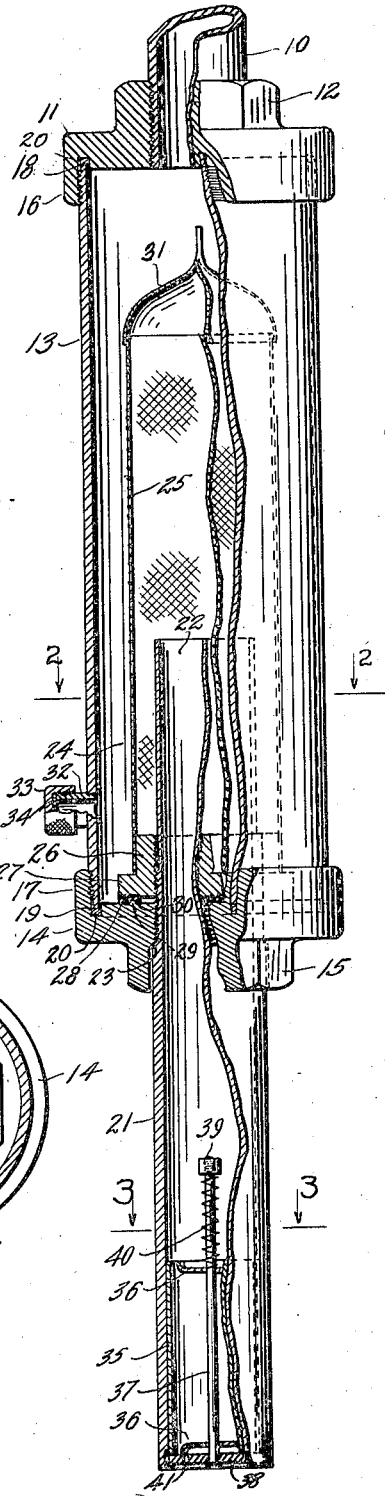
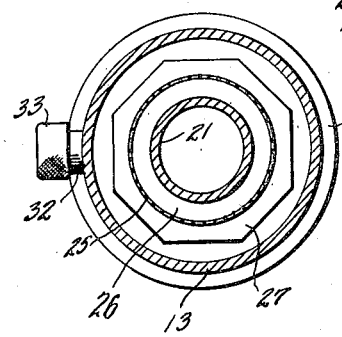
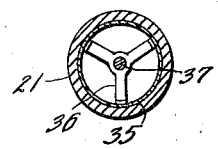
FIG. 1.
FIG. 2.
FIG. 3.
INVENTOR
Martin E. E. Dardani
BY
Wooster & Davis
ATTORNEYS Patented July 24, 1923.

1,463,006

UNITED STATES PATENT OFFICE.

MARTIN E. E. DARDANI, OF FAIRFIELD, CONNECTICUT.

GASOLINE FILTER.

Application filed September 7, 1921. Serial No. 499,031.

*To all whom it may concern:*

Be it known that I, MARTIN E. E. DARDANI, a citizen of the United States, residing at Fairfield, county of Fairfield, State of Connecticut, have invented an Improvement in Gasoline Filters, of which the following is a specification.

This invention relates to a filter, and particularly a filter to be attached to the end of a hose upon the pump at filling stations for automobiles, to prevent dirt and water being deposited in the automobile gasoline tank to clog up the pipes, carburetor, and so forth.

It is an object of the invention to provide a filter which will effectively prevent the entrance of dirt and water to the tank and which will, at the same time, be simple in construction and easily assembled and disassembled for cleaning and repairing.

It is also an object of the invention to provide such a filter that will not retain any considerable amount of gasoline at the end of the filling operation.

It is a still further object of the invention to provide a filter which will not collect dust and dirt when not in use which will later be deposited in the tank on the next filling operation.

With the foregoing and other objects in view I have devised the improved filter illustrated in the accompanying drawings, in which, Fig. 1 is a partial, central, vertical section of my improved filter.

Fig. 2 is a transverse section substantially on the line 2—2 of Fig. 1, and

Fig. 3 is a transverse section substantially on the line 3—3 of Fig. 1.

Reference number 10 represents the metal end on an ordinary filling hose connected with the pump used in connection with reservoirs at a filling station. This end is externally threaded for the attachment of the end cap 11 of my improved filter, a portion 12 of this cap being formed square or hexagonal for the application of a wrench when applying the filter to the hose. The body of the filter is composed of a metal tubular casing 13, closed at one end by the cap 11 and at the other end by a similar cap 14, shaped for the application of a wrench at 15. The two caps are formed with annular internally threaded flanges 16 and 17, respectively, with annular grooves 18 and 19 adapted to receive a suitable non-corrosive gasket or packing 20 upon which the ends of the casing 13 seat to make a liquid tight connection when the two caps 11 and 14 are screwed onto the ends of this casing, the ends of the casing being externally threaded to receive the ends of these caps. The cap 14 is provided with a central threaded opening through which extends a section of pipe 21, this pipe being reduced at its inner end 22 and exteriorly threaded intermediate its length so that it may be threaded in the opening in the cap 14, a suitable stop shoulder 23 being provided to limit this movement. The inner end 22 of the pipe extends a certain distance within the casing 13, as shown, to form a sediment and water chamber 24 between this pipe and the casing. The height of this pipe, within the casing from the cap 14, is preferably such that the volume of the sediment and water chamber is slightly greater than the capacity of the casing 13, when lying in a horizontal position, between its lower longitudinal edge and the adjacent edge of the pipe 21 so that, no matter in what position the filter may be placed, the water and sediment in the chamber 24 cannot pass out through the pipe 21.

Within the casing 13, between it and the pipe 21, I place a filter element 25 which is preferably made of a tubular piece of fine wire metal screen secured at one end over a flange 26 on a collar 27 having a central opening threaded to fit on the outer surface of the pipe 21. The outer surface of this collar is provided with a V-shaped annular rib 28, and the cap 14 on its inner surface is formed with a similar rib 29. A flat ring-shaped gasket 30, preferably of soft metal such as lead, is placed between these elements over the ribs 28 and 29 when assembling, making a tight joint between the cap 14 and the collar 27. As will be seen from an inspection of the drawing, the filter 25 is spaced from both the casing 13 and the pipe 21 so that the entire surface of this filter will allow passage of the fluid being filtered. The free end of this filter element is preferably closed by means of an imperforate metal cap 31 in alinement with the inlet from the hose 10, and not only protects the filter from injury by a solid particle which might be forced into the casing, but also prevents any deposit which might be left on this end of the filter from one filling being forced through the filter by pressure of the flow of a stream of gasoline for the next filling operation, the effect of which is practically a blow on this deposit when the flow commences. Any sediment or water, which is collected in the chamber 24, may be removed through a drain comprising a nipple 32 secured in the side of the casing 13, closed at its outer end by threaded cap 33 having a noncorrosive gasket 34 between the cap and the end of the nipple to present a tight joint.

The lower or discharge end of the pipe 21 is provided with means for closing the same, when not in use, to prevent entrance of dust and dirt through the pipe which would, on the next filling operation, be deposited in the gasoline tank. Inserted in the end of the pipe is a sleeve 35 having a tight fit with the interior of the pipe, and having secured on the inner side thereof at opposite ends the spiders 36 provided with central openings in which is slidably mounted a rod 37, having secured at the outer end thereof a flat disc forming a valve 38. The inner end of the rod 37 is threaded and a suitable unit 39 is mounted thereon. Surrounding the rod between the unit 39 and inner spider 36 is a very light spring 40 tending to hold the valve 38 seated against the end of sleeve 35. The pressure of the spring is adjusted by means of a nut 39 so that it just holds the disc or valve 38 on its seat to close the end of the pipe and prevent entrance of dust and dirt when it is not in use, but still to offer practically no resistance to flow of liquid through the pipe. The disc or valve 38 is provided with an opening to allow all the liquid in the pipe to be drained therefrom.

Although I have shown and described my invention as applied to a filling hose for service stations it, obviously, is not confined to use therewith but may be used anywhere devices of this type are desired. It will further be apparent that I have devised an all-metal filter which will be effective in operation, which is simple in construction and not liable to get out of order, and which may be easily cleaned.

Having thus set forth the nature of my invention, what I claim is:

1. A filter comprising a casing, an inlet at one end thereof, an outlet pipe at the other end and extending into the casing and spaced therefrom to provide a sediment chamber, a screen surrounding said pipe and spaced from it and the casing, and an imperforate cap carried by the screen in alignment with the inlet.

2. A filter comprising a casing, an inlet at one end thereof, an outlet pipe at the other end, a filter screen in the casing between the inlet and outlet, and an imperforate cap carried by said screen in alignment with the inlet.

3. A filter comprising a tubular casing, an inlet at one end, a cap secured to the other end, an outlet pipe extending through said cap and projecting into the casing to form a sediment chamber and communicating therewith only adjacent its inner end, and a tubular screen in the chamber between the inlet and said pipe and surrounding and spaced from the latter.

4. A filter comprising a tubular casing, an inlet at one end, a cap secured to the other end, an outlet pipe provided with an opening adjacent its inner end, said pipe extending through said cap and projecting into the casing and spaced therefrom to form a sediment chamber, a tubular screen in the chamber between the inlet and said pipe extending longitudinally of the casing, and an imperforate cap carried by the end of said screen adjacent said inlet.

5. A filter comprising a tubular casing, an inlet at one end, a cap for closing the other end of the casing having an opening therethrough, an exteriorly threaded pipe extending through said opening and provided with a shoulder contacting with the cap to limit the inward movement of the pipe, a collar threaded on said pipe within the casing, and reacting with the cap to secure the pipe therein, and a tubular filter element secured to said collar and surrounding the pipe.

In testimony whereof I affix my signature.

MARTIN E. E. DARDANI.